United States Patent Office

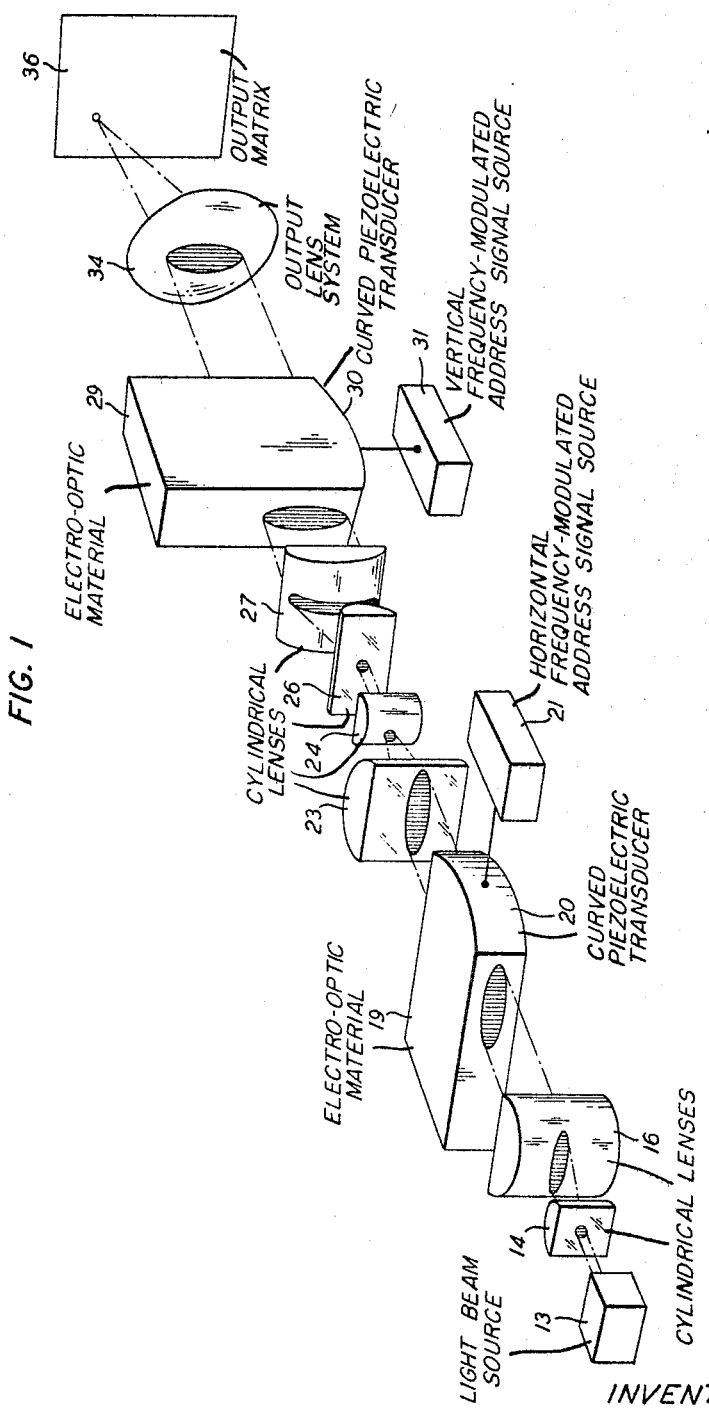

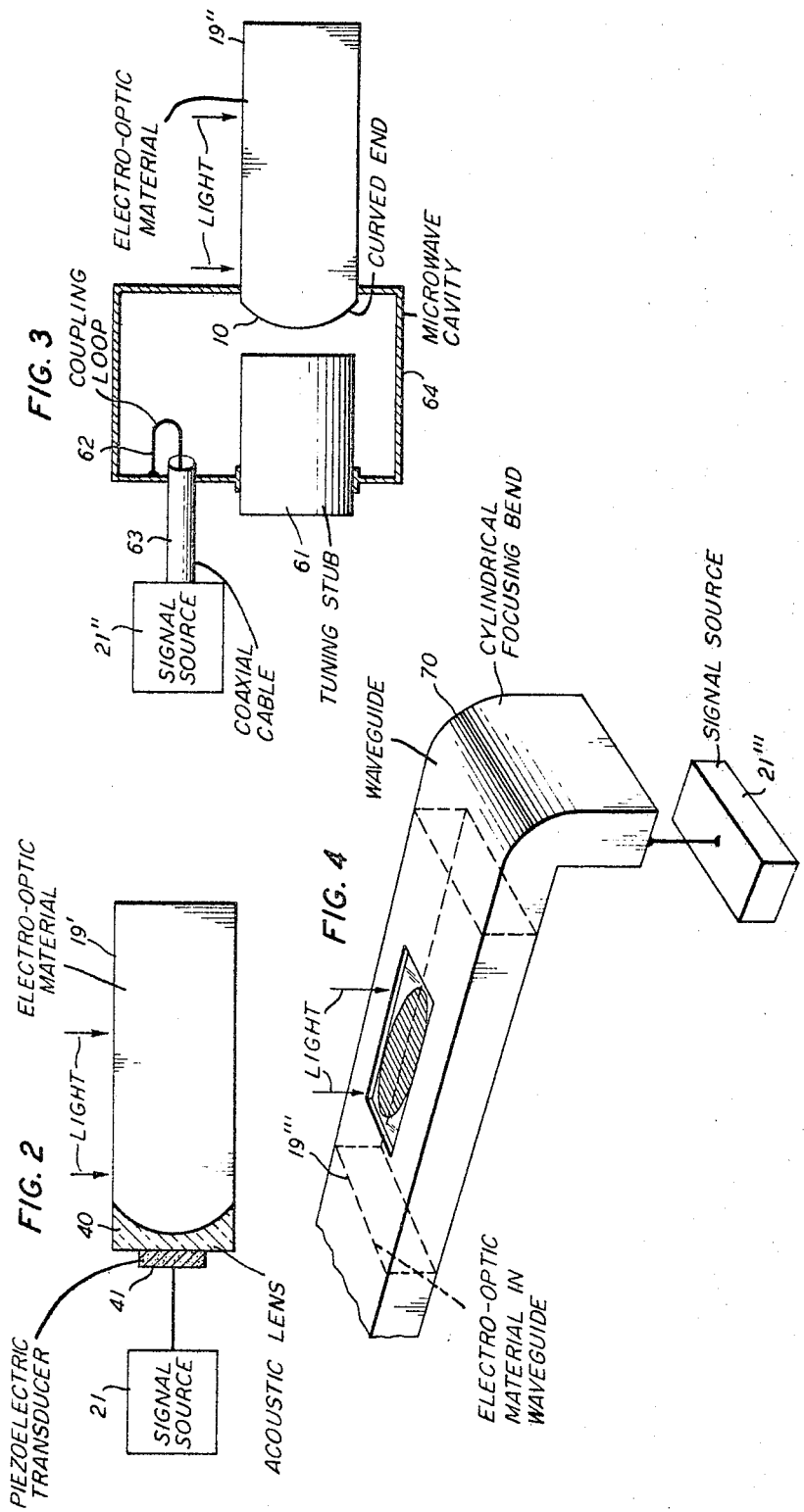

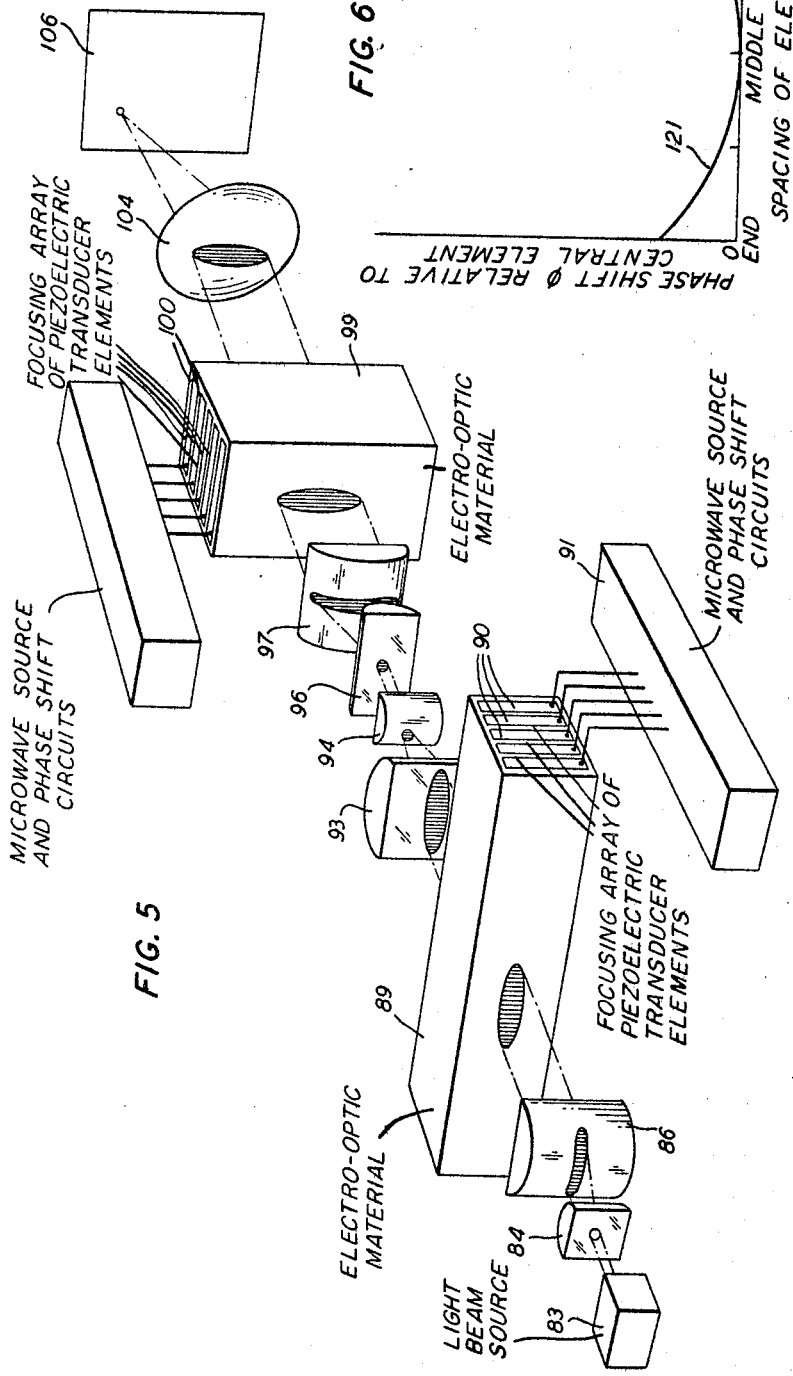

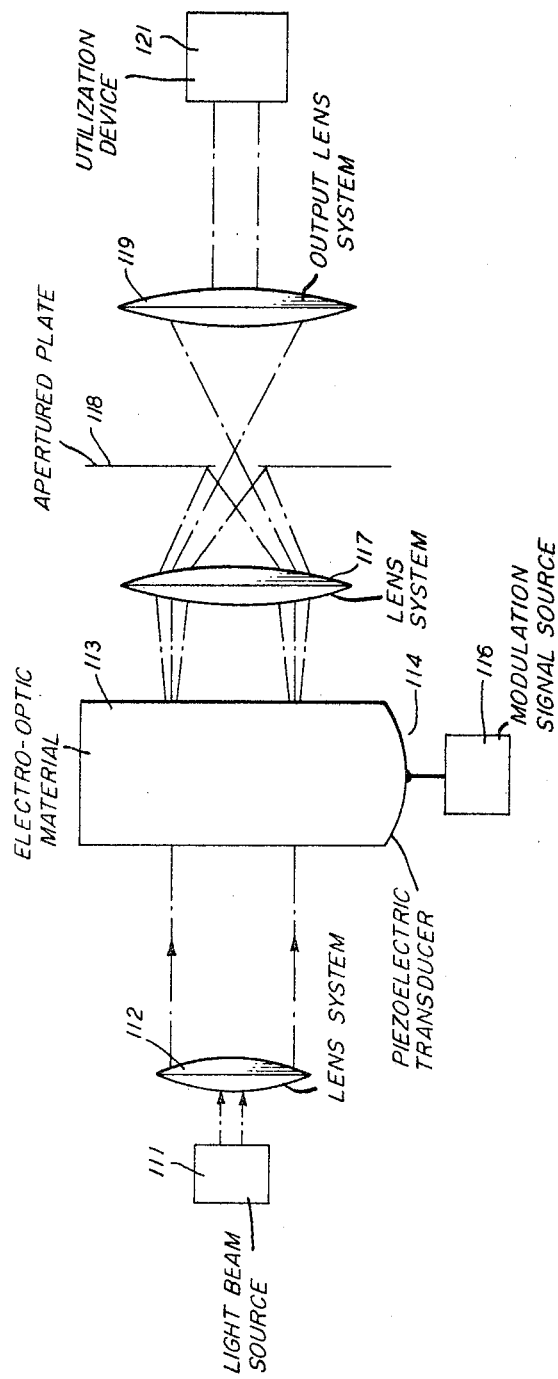

3,435,228
Patented Mar. 25, 1969

3,435,228
LIGHT BEAM CONTROLLING SYSTEM
Eugene I. Gordon, Convent Station, N.J., assignor to Bell Telephone Laboratories Incorporated, New York, N.Y., a corporation of New York
Filed Mar. 1, 1966, Ser. No. 530,893
Int. Cl. H04b 9/00
U.S. Cl. 250—199    3 Claims

ABSTRACT OF THE DISCLOSURE

Light beam deflection apparatuses of the acousto-optical diffraction-grating type are disclosed. In order to increase the acoustic modulation bandwidth, a focused acoustic beam is launched into an electro-optic medium in which the acousto-optical interaction occurs.

The focused acoustical beam is launched either by a cylindrically curved piezoelectric thin film transducer deposited on a cylindrically curved surface of the electro-optic medium, by an array of transducers driven in the appropriate phases to produce the focused beam, or by focused microwaves in a waveguide.

---

This invention relates to optical beam systems and, more particularly, to systems involving the deflection of an optical beam for use in memory, logic, switching and light modulation arrangements.

In my copending patent application Ser. No. 377,353, filed June 23, 1964, and assigned to the assignee hereof, there is disclosed an electro-optic diffraction-grating deflector in which microwave-excited wave-like variations in the index of refraction deflect a beam of light that is appreciably broader than the spatial period of the variation, the range and speed of deflection being appropriate for the foregoing uses. Such high-frequency variations in the index of refraction will be called acoustic waves in what follows because of their similarity to the prior art acoustic waves which produce variations of index of refraction, although the latter variations are at much lower frequencies and are much less useful for light beam deflection. In the case of the electro-optic effect the variation in the index of refraction arises from an electromagnetic wave which nevertheless has an extremely small phase velocity. This velocity is closer to the velocity of sound than the velocity of light. In the case of the photoelastic effect, the variation in index of refraction arises from a hypersonic strain or elastic wave which is in fact an acoustic wave.

The range of deflection in any given coordinate is related to the total frequency range over which the electrical input can be varied and still provide acoustic waves that achieve significant light scattering. The speed of deflection is the inverse of the time required for a change in deflection, which is the same as the time required for a change in the effective frequency of the acoustic wave. The latter time period is approximated by the transit time of an acoustic wave across the light beam.

Further, it is taught in my above-cited copending application that the total capacity, or number of usable spots in the output matrix, of such a system is given by the square of the product of the foregoing frequency range of the acoustic waves and their transit time across the light beam.

The transit time is usually limited by practical considerations; that is, a very short access time is desired in most of the foregoing systems. Therefore, efforts to increase the total capacity of such systems have been directed to increasing the effective frequency range of the acoustic waves. It is known that decreasing the width of the transducer that converts the input electrical signal into acoustical waves will increase the frequency range over which the acoustic waves can achieve significant scattering of the light, with the scattering efficiency being fairly uniform over that range; but increased input power is required to achieve significant amounts of light deflection even though a narrow transducer is generally capable of handling less power than one of large width. In compromising the various design considerations to achieve systems of large capacity, a limit is reached beyond which transducers are overtaxed with respect to their power handling capabilities.

According to my present invention, this limitation is overcome by focusing the acoustic energy to form an acoustic wavefront that is circularly curved in at least one dimension. In any arrangement employing this principle, the focusing means has an effective width greater than the width of the waist that is characteristic of the beam according to diffraction theory. With this scheme, relatively large transducers are effective to provide much larger effective frequency ranges than heretofore. In particular, I have recognized that the size of the acoustic beam waist in the plane defined by the directions of propagation of the light and acoustic beams is the true determinant of the effective frequency range. Previously, transducer width had seemed relevant because the planar transducers always employed formed an acoustic beam that had its waist at the transducer and the width of the beam waist corresponded to the width of the transducer.

Moreover, to achieve the improved effective frequency range of the acoustic waves, it is not necessary that the acoustic beam waist ever be formed, so long as within the deflection medium the acoustic waves are converging toward or diverging from a focus which is the position of the beam waist. Nevertheless, the interaction can also be produced at the beam waist.

A preferred embodiment of the invention employs a cylindrically curved transducer coupled to a cylindrically curved surface of the electro-optic medium. Alternatively, a plurality of transducers may be employed in phased array to produce a cylindrically curved acoustic wavefront. Also, a bicylindrically or spherically curved acoustic wavefront may be employed if it is desired to simultaneously reduce the narrow dimension of the acoustic beam at the point of interaction.

A more complete understanding of the present invention may be obtained from the following detailed description, taken in conjunction with the accompanying drawing, in which:

FIG. 1 is a perspective view of a preferred illustrative embodiment of the invention;

FIG. 2 is a top view of a modified form of one of the acoustic light-deflecting devices useful in the arrangement of FIG. 1;

FIG. 3 is partially a sectional view and partially a top view of another modified form of one of the acoustic light-deflecting devices useful in the arrangement of FIG. 1;

FIG. 4 is a perspective view of still another modified form of one of the acoustic light-deflecting devices for use in the arrangement of FIG. 1;

FIG. 5 is a perspective view of another illustrative embodiment of the invention, wherein a plurality of laterally spaced transducers generate the cylindrically curved acoustic wavefront;

FIG. 6 shows a curve of the relative phase shifts among transducers in the embodiment of FIG. 5; and FIG. 7 is a partially pictorial and partially block diagrammatic illustration of a light modulation system employing the principles of the invention.

In FIG. 1, there is shown, for the purposes of illustrating the invention, an information storage system utilizing the deflection arrangement of the present invention.

In the system of FIG. 1, a source 13 directs a collimated light beam through first and second cylindrical lenses 14 and 16, which impart to the beam an elliptical cross-section of broadest dimension greater than the acoustic wavelength, into a crystal 19 of electro-optic or photoelastic materials, such as potassium-tantalate-niobate (KTN), lithium niobate (LiNbO$_3$) or other suitable material. Preferably, the broadest transverse dimension of the light beam in crystal 19 is many acoustic wavelengths in the direction of propagation of the acoustic beam.

Although KTN generally produces a quadratic electro-optic effect, a substantially linear effect may be obtained with direct current biasing means, which are not shown because they are well known in the art. Many other suitable electro-optic materials provide a linear electro-optic effect without bias. Lithium niobate provides a large photoelastic effect.

One lateral end of crystal 19 is ground to have a surface that conforms to a segment of a cylinder, the curvature being in the plane defined by the directions of propagation of the light and acoustic beams. Bonded to this cylindrically curved surface is a piezoelectric transducer 20 such as a thin film of cadmium sulfide or zinc oxide. Coupled to the transducer 20 is a source 21 of the electrical input signal, for example, a microwave signal.

Cascaded beyond the crystal 19 in the path of the light beam are the cylindrical lenses 23 and 24 which return the beam to its original circular cross-sectional shape, and the cylindrical lenses 26 and 27, which impart to the beam an elliptical cross section having a major axis oriented at right angles to the major axis of the beam's first elliptical cross section.

Cascaded beyond lens 27 is the electro-optic or photoelastic crystal 29, piezoelectric transducer 30, and input electrical signal source 31, which are similar to the components 19, 20 and 21, with the exception that they are oriented generally at right angles with respect to the spatial orientation of the respective similar components, so that the light beam can be deflected in two orthogonal planes by the combination. Other optical arrangements for directing and shaping the light beam as appropriate for passage through the deflecting stages and thence to one or more output matrices are known to those skilled in the art. Also, it is unnecessary to have the components at right angles. Furthermore, by doubling the beam back on itself one can actually use the same crystal with a second beam parallel to the first.

The emergent beam is directed through a lens system 34, shown in FIG. 1 as a single lens but which may contain a plurality of lenses. Lens system 34 functions at least in part as a telephoto lens system which focuses the beam to a point on the output matrix 36.

The source 13 may be any one of a member of devices, but is preferably an optical maser because of the spatial coherence and brightness of the light output of such devices. Nevertheless, the source 13 could also be an incoherent source of substantial brightness after filtering to have a relatively narrow band of frequencies.

The cylindrical lenses 14, 16 and 23 through 27, and, in part, the lens system 34, may be replaced with triangular prisms of light-transmissive material on the front and back faces of crystals 19 and 29, as shown in FIG. 3 of my above-cited copending patent application. The prisms may be of the same material and continuous with crystals 19 and 29 or may be of another material suitably bonded to the crystals and matched thereto for passage of the light beam.

Alternative forms of the acoustic beam focusing transducers 20 and 30 are discussed below in connection with FIGS. 2-5.

Sources 21 and 31 may take a number of forms. They may be, for example, crystal controlled oscillators which can be individually switched into the input line or voltage tunable oscillators, the respective outputs of which are frequency-modulated with the separate components of address information, corresponding to horizontal and vertical coordinates in matrix 36. As is known, the microwave signal is typically applied to the transducer 20 or 30 through a coaxial cable (not shown), the center conductor of which is attached to the piezoelectric thin film and the outer conductor of which is attached to a metallic film (not shown) that bonds the piezoelectric thin film to the crystal 19 or 29 respectively and forms an interface with said crystal. A variety of other methods of applying the signal to the thin film are also possible. When the medium is KTN, for example, other means for injecting microwave energy include that described in M. G. Cohen and E. I. Gordon, "Electro-Optic Gratings for Light Beam Modulation and Deflection," Applied Physics Letters, vol. 5, pp. 181-182, Nov. 1, 1964.

The lens system 34 may be arranged to split the deflected light beam into a number of channels, thereby increasing the total memory store.

The output matrix 36 may comprise an array of light-sensitive storage devices, an array of photosensitive switching elements, a coding plate, or any one of a number of kinds of devices, depending upon the particular use or application of the deflection system.

In the embodiment of FIG. 1, the light beam is shown passing through the deflection medium at right angles to the direction of propagation of the acoustic signal. In certain cases, in order that the angle between the direction of incidence of the light beam and the direction of propagation of the acoustic wave may be optimized, and depending on the material used, the light beam may be advantageously incident upon the crystals 19 and 29 at an angle. Further, the light beam passes as close as possible to the acoustic transducers to minimize access time.

In operation, the basic principles are the same as in the embodiments of my above-cited copending application. Those basic principles that are pertinent to the present invention may be summarized as follows.

The properties of the material 12 are such that, for light polarized properly relative to the direction of propagation of the microwave-excited acoustic wave, the acoustic wave induces a variation in the optical index of refraction of the crystal 19. This traveling variation in the index of refraction can be considered to be a moving diffraction grating; and, at high microwave frequencies with optical beam width adapted to exceed the acoustic wavelength, virtually all of the light that is deflected falls into the first grating order.

The interaction is basically a parametric one involving the incident and deflected light beams and the acoustic wave. The proper choice of the angle $\theta$ between the directions of the acoustic wave and the incident light beam allows phase-matching, so that a large amount of optical energy is deflected (as well as frequency-shifted). The deflection of the emergent optical beam varies directly as the acoustic frequency (assuming constant acoustic velocity as a function of frequency), and, the range of deflection angles $\Delta\alpha$ is proportional to the effective frequency range $\Delta\Omega$ of the acoustic waves. At the limits of the effective range, appreciable phase-mismatch decreases the efficiency of the parametric interaction.

It can be shown that the total number of resolvable spots to which the beam may be focused is approximately $$N \doteq (\Delta f \tau \cos^2 \theta)^2 \qquad (1)$$

where $\Delta f$ is the total effective frequency range of the microwave input signal, and $\tau$ is the approximate transit time of the acoustic signal across the optical beam. $\tau$ also represents the minimum time in which the microwave signal frequency can be changed to produce a new deflection angle. It is slightly smaller than the actual access time for a given address in output matrix 36, in view of practical crosstalk and positioning requirements.

It should be noted that, as the light beam propagates through the system of FIG. 1, the actual amount of deflection at the exit faces of each of the crystals 19 and 29 is quite small in relation to the dimensions of the beam; and in fact this mode of operation is desirable for efficient use of the acoustic energy and the obtaining of a substantial amount of power in the deflected beam. The lens system 34 and the positioning of the output matrix 36 provide the effect of magnifying these small deflections, as desired in a deflection system.

The operation of the present invention involves the following additional characteristics.

The cylindrically curved transducers 20 and 30 launch acoustic waves with cylindrically curved wavefronts. The cylindrical wavefronts converge toward a beam waist, the dimensions of which are determined by diffraction theory. In this respect, the behavior of the high frequency acoustic beam is directly analogous to the behavior of a light beam.

For the purposes of modulating the beam of light passing through crystal 19, the beam waist need not necessarily be actually formed in crystal 19. In fact, matched absorbing terminations may be used on the left-hand ends of crystals 19 and 29 so that beam waist is never formed in or outside of the crystals. The bandwidth and strength, or scattering efficiency, of the interaction remain substantially constant, for a given size waist, regardless of the position at which the light beam passes through the acoustic beam in crystal 19.

The operating characteristics of the present invention may be explained mathematically as follows.

Assume that the direction of propagation of the acoustic beam is the x-axis, the direction of polarization of the light is the z-axis, and the y-axis is at an angle $\theta_0$ with respect to the direction of propagation of the light. This angle $\theta_0$ is shown to be very small in the embodiments of FIGS. 1 and 5. The angular dependence of the scattering interaction at any point along the beam can be shown to satisfy the relationship $$V_1(\theta_0)|_{x'} = V_0 \left[ -\frac{1}{2} i \cdot \exp\left( iKy \frac{(\sin \theta_0 - \sin \theta)}{\cos \theta_0} \right) \right] \cdot \int_{-\infty}^{+\infty} dy' \xi(x', y')^* \exp\left( -iKy' \frac{(\sin \theta_0 - \sin \theta)}{\cos \theta_0} \right) \quad (2)$$

$V_1(\theta_0)|_{x'}$ is the amplitude of the scattered light for an interaction taking place near the plane at $x'$ as a function of the angle of incidence of the incident light beam, $K = \Omega/V$ is the acoustic propagation constant, $f = \Omega/2\pi$ is the acoustic frequency, and V the phase velocity. The quantity $V_0$ is the amplitude of the incident light, $\xi$ is the incremental phase retardation per unit length produced by the induced variation in the index of refraction, and $\theta$ will be defined below.

Further, $$\xi(x, y) = k\Delta n(x, y)/\cos \theta_0 \quad (2a)$$

in which $k$ is the free-space propagation constant of the light and $\Delta n$ is the variation in the index of refraction $n$ produced by the acoustic beam.

The acoustic strain is $$S(x, y, t) = S_c(x, y) \cos(\Omega t - Kx) + S_s(x, y) \sin(\Omega t - Kx) \quad (3)$$

Suppressing the tensor character of the photoelastic constant yields as the proper relationship between $\Delta n$ and S, $$\Delta n = \frac{1}{2} n^3 p (S_c + iS_s) = \frac{1}{2} n^3 p \overline{S} \quad (4)$$

where $p$ is the photoelastic constant and in general, depends on the polarization of the incident light.

Equation 2a can be rewritten as $$\xi(x, y) = \frac{1}{2} k n^3 p \overline{S}(x, y)/\cos \theta_0 \quad (5)$$

The angle $\Theta$ in Equation 2 is defined by the Bragg condition $$\sin \Theta = \frac{1}{2} K/nk \quad (6)$$

The relative scattered energy or scattering efficiency is defined by $$|V_1(\theta_0)|_{x'}/V_0|^2 = \frac{1}{16} \frac{k^2 p^2 n^6}{\cos^2 \theta_0} \left| \int_{-\infty}^{+\infty} dy' \overline{S}(x', y')^* \exp-ik\left( \frac{\sin \theta_0 - \sin \Theta}{\cos \theta_0} \right) y' \right|^2 \quad (7)$$

We may choose the most convenient value of $x'$ to evaluate this equation. The independence of the interaction from variation with $x'$, although not proved here, can be understood intuitively by realizing that the scattered light amplitude for a given angle of incidence is uniquely determined by the angular distribution, or far field pattern, of acoustic energy. This distribution, except for phase factors, cannot change as a function of $x'$. These broad principles are taught in my article with M. G. Cohen, "Acoustic Beam Probing Using Optical Techniques," The Bell System Technical Journal, vol. 44, pp. 693–721, April 1965.

Following these principles, Equation 7 may be evaluated at the beam waist, whether it is actually formed or not.

Accordingly, $$|V_1/V_0|^2 = \frac{1}{16} \frac{k^2 p^2 n^6 L^2}{\cos^2 \theta_0} \left[ \frac{\sin \frac{1}{2} KL\Delta\theta}{\frac{1}{2} KL\Delta\theta} \right]^2 |\overline{S}|^2 \quad (8)$$

in which $\Delta\theta$ is the deviation, $\theta_0 - \Theta$, from the Bragg angle $\Theta$; L is the width of the beam waist in the plane defined by the propagation directions of the light and acoustic beams; and $V_1$ is the amplitude of the scattered light. The half-power points $\Delta\theta_{1/2}$ are defined by $$\frac{1}{2} KL\Delta\theta_{1/2} \approx \pm 0.45\pi \quad (9)$$

$$2\Delta\theta_{1/2} \approx 1.8\pi/KL \quad (10)$$

which is just the diffraction angle of the acoustic beam.

From Equation 6 and the definitions following Equation 2, $$\sin \Theta = \pi f/nvk \quad (11)$$

To a first approximation, $$2\Delta\theta_{1/2} \approx \pi \Delta f/nkv \cos \theta_0 \quad (12)$$

Combining Equations 10 and 12 one obtains $$\Delta f \approx 1.8 nkv \cos \theta_0/KL \quad (13)$$

Since L is the beam waist diameter, it is clear that the bandwidth of the interaction may be varied just by varying L.

Increasing the bandwidth, by decreasing L, requires increased acoustic power to achieve the same amount of scattered light as follows from Equation 8. The relationship can be shown to be approximately as follows:

$$\Delta f |V_1/V_0|^2_{max} = \text{constant} \times \text{acoustic power} \quad (14)$$

if one notes that the acoustic power is proportional to $|\overline{S}|^2 L$. The constant of Equation 14 depends on the acoustic beam energy distribution and the material parameters.

If we wish to maintain the scattering efficiency of $|V_1/V_0|^2$ constant when we increase $\Delta f$, then we must increase acoustic power.

In view of the foregoing analysis, a partical way to decrease L, to increase $\Delta f$, and simultaneously to increase acoustic power capacity is to provide a transducer of width great enough to handle the power and to focus the acoustic beam to a sufficiently small waist L. In other words, the embodiment of FIG. 1 provides a greater bandwidth than if the transducers were planar; or, viewed in another way, it provides stronger scattering interactions than if the small acoustic beam waists were provided by small, power-limited transducers.

Various modifications in the deflection stage of the embodiment of FIG. 1 can be made.

One of these modifications is shown in FIG. 2, wherein a crystal 19', which is like crystal 19 of FIG. 1 but could alternatively be lithium niobate, has a cylindrically curved end surface to which the planar transducer 41 is coupled through the focusing lens 40. In this case, the lens forms the curved interface with the active crystal. For example, the transducer 41 may be evaporated cadmium sulfide and the lens 40 may comprise any of a variety of low loss acoustic materials with an acoustic phase velocity different than that of crystal 19' such as quartz. Matching coatings may be applied to either surface of lens 40, in order that the acoustic wave may be efficiently generated and that no reflections result from the interface. It will be noted that one surface of the lens 40 conforms to the cylindrically curved surface of crystal 19' and is effective to produce focusing of the acoustic beam within crystal 19'. The overall operation of the embodiment of FIG. 1 would remain essentially the same after this modification.

Another modification of the deflection stage of the embodiment of FIG. 1, shown in FIG. 3, involves exciting a crystal 19", similar to crystal 19 of FIG. 1, by placing its cylindrically curved end in a microwave cavity 64. The microwave signal from source 21" is coupled into cavity 64 through a coaxial cable 63 and a microwave coupling loop 62, one end of which is attached to the center conductor of cable 63. The other end of coupling loop 62 and the outer conductor of cable 63 are connected directly to the conductive material forming cavity 64. To improve the coupling of the microwave energy into the cylindrically curved end 60 of crystal 19", a tuning stub 61 of the same material as crystal 19 is adjustably mounted to form a gap with respect to crystal 19 that is smaller than the cavity dimensions. The gap may be varied by sliding stub 61 toward or away from crystal 19", in order to achieve the best gap for the particular frequency range of interest.

The focusing of the acoustic beam in crystal 19" will be accomplished as effectively as with the deflection elements of FIGS. 1 and 2 and may be effective at higher frequencies than the others.

Alternatively, as shown in FIG. 4, a crystal 19''' may be placed in a waveguide 70, and the acoustic energy may be focused by a cylindrical bend in the waveguide between microwave source 21''' and crystal 19'''. In this embodiment, the focusing occurs only in the plane defined by the direction of propagation of the acoustic beam and by the direction of propagation of the light beam, and is a result of the varying angle of incidence of various parts of the wavefront of the microwave upon the cylindrical focusing bend.

A further modification is shown in a complete arrangement in FIG. 5. The arrangement of FIG. 5 is the same as that of FIG. 1, except that the focused acoustic waves are launched from planar surfaces of crystals 89 and 99 by means of multiple transducers driven in phased array.

More specifically, a linear array of five transducer elements 90 are disposed on one end of crystal 89 and are driven from a source 91 of phased microwave signals to generate a cylindrically curved acoustic wavefront. Similarly, a linear array of five transducer elements 100 are disposed on one end of crystal 99 and are driven from a source 101 of phased microwave signals to generate a cylindrically curved acoustic wavefront. In general, the transducer elements are driven with electrical signals phase-shifted with respect to one another and coupled to said elements in a sequence appropriate for generating a wavefront curved in the plane defined by the directions of propagation of the light and acoustic beams. The transducers 90 and 100 are cadmium sulfide or zinc oxide thin films bonded to the respective crystals by metallic thin films (not shown) and are provided with appropriate isolation one from the other.

The sources 91 and 101 each include a plurality of phase shift circuits, each of which is coupled to one transducer in a one-to-one relationship.

The phase shifts of the phase shift circuits in each source 91 or 101 are adjusted with respect to each other so that the phases of their output signals are related to their spacing in their respective columns and rows as shown by curve 121 of FIG. 6. That is, the phase shifts between neighboring elements are smallest for elements nearest the most central element of the array and largest on the periphery of the array. Since the phase shifts are directly related to the $x$-axis (acoustic propagation direction) relative displacement of the corresponding points on the generated acoustic wavefront, this curve provides a visual picture of what one would see in a section through the wavefront. In this case, the wavefront subtends a 90° angle from the center of curvature in the plane defined by the directions of propagation of the light and acoustic beams. Calculations of phase-shifts for any desired wavefront and any desired number of transducer elements are a routine exercise in analytical geometry.

It should be borne in mind that, with a finite number of phase array transducers, the wavefront is not perfectly cylindrically curved, but is very close thereto. Accordingly, the bandwidth achieved is nearly as great as that of FIG. 1; and, in general, a comparable amount of acoustic power may be generated.

Acoustic light modulation systems may also be provided with increased bandwidth by employing the focusing principles of the present invention.

In FIG. 7, such a modulation system comprises a light beam source 111 which directs a beam of light into a lens system 112, shown schematically as a single lens, but which may be a number of lenses and/or prisms, which produces a beam of elliptical cross-section, as in the deflection system embodiments described above. The elliptical light beam is directed through a crystal 113, for example, $LiNbO_3$ at the Bragg angle (here shown as being very small) with respect to the direction of propagation of a modulating acoustic beam generated by transducer 114. The transducer 114 is illustratively a cadmium sulfide thin film deposited on a cylindrically curved end surface of crystal 113 and driven by the microwave electrical input signal source 116, the curvature being in the plane defined by the directions of propagation of the light and acoustic beams. Transducer 114 could assume any of the other forms shown in FIGS. 2–5. The source 116, which provides the modulating signal, may take a number of forms, for example, a backward wave oscillator or a klystron producing an amplitude modulated microwave signal.

As explained in the foregoing, the effect of the microwave signal in the crystal 113 is to produce a moving acoustic diffraction grating which deflects the light beam, the amount of energy deflected being dependent on the amplitude of the deflecting signal. As a consequence, the light beam emerging from crystal 113 has energy components in its fundamental or zero grating order and in either its plus or minus first orders or both. The amount of energy removed from the zero order beam varies directly with the amplitude of the modulating signal. The emergent beam passes through a lens systems which focuses it to a point, the focal points of the first order modes being displaced from the focal point of the zero order mode, as shown. An apertured plate 118, placed at the focal plane, passes the zero order beam and blocks passage of the higher orders. Thus, the light passing through the aperture in plate 118 is an amplitude-modulated zero order beam. This beam is directed through a lens system 119 which produces a collimated modulated beam. The modulation system is completed by a utilization device 121 into which the beam is directed. Device 121 may be any one of a number of devices, such as an amplifier for amplifying the light for transmission or a photodetector for detecting the modulations on the beam.

As in the preceding embodiments of the invention, and as clarified by the mathematics set out above, the focusing of the acoustic beam in crystal 113 increases the bandwidth of the modulation and enables a larger transducer 114 to be employed to supply the needed modulating power.

Numerous other applications of the principles of the present invention may occur to workers in the art without departing from the spirit and scope thereof.

It should be particularly noted that even if the transducers produced a convex, divergent, wavefront instead of a concave, convergent wavefront, the effect would be the same, in that the (virtual) beam waist still is smaller in cross-section than the transducer area.

Still further, the power handling capabilities of the transducers can be further increased by focusing in a second plane orthogonal to the plane of the directions of propagation of the light and acoustic beams. In general, the foci in the two planes should not occur in the same region of the deflecting medium, in order that fracture may be avoided. It should be noted that the deflecting interaction would desirably occur at the beam waist in the second plane, for maximum efficiency; but an increased access time results, since the interaction occurs farther from the acoustic transducer.

What is claimed is:

1. A combination of the type including a medium in which a beam of electromagnetic wave energy can be deflected by an acoustical beam in a scattering interaction, means for supplying said beam of electromagnetic wave energy to said medium, and means for focusing said acoustical beam into said medium to interact with said beam of electromagnetic wave energy, said combination being characterized in that said focusing means comprises a plurality of piezoelectric transducer elements coupled to said medium at spaced intervals and means for driving said transducer elements with signals having relative phase shifts providing focusing of said acoustical beam.

2. A combination according to claim 1 in which the driving means provides a phase shift between signals for neighboring elements that is smallest for elements nearest the most central element and largest for elements on the periphery of the array.

3. A combination according to claim 2 in which the plurality of transducer elements are coupled to the medium at positions spaced apart in the plane defined by the electromagnetic wave energy beam and the acoustical beam.

References Cited

UNITED STATES PATENTS

| | | | |
|---|---|---|---|
| 2,707,749 | 5/1955 | Mueller | 250—199 |
| 3,204,104 | 8/1965 | Baird | 350—150 |
| 3,239,671 | 3/1966 | Buhrer | 350—150 |
| 3,297,876 | 1/1967 | De Maria | 250—199 |
| 3,305,292 | 2/1967 | Miller | 350—150 |
| 3,330,956 | 7/1967 | Wade | 250—199 |

ROBERT L. GRIFFIN, *Primary Examiner.*

ALBERT J. MAYER, *Assistant Examiner.*

U.S. Cl. X.R.

332—7.51; 350—150